United States Patent [19]

Burger

[11] 4,233,725
[45] Nov. 18, 1980

[54] METHOD AND APPARATUS FOR INSERTING A FLEXIBLE INNER CONTAINER WITHIN A RIGID OUTER CONTAINER

[75] Inventor: Norman D. Burger, Culver City, Calif.

[73] Assignee: Nicholas A. Mardesich, Palos Verdes Estates, Calif. ; a part interest

[21] Appl. No.: 10,899

[22] Filed: Feb. 9, 1979

Related U.S. Application Data

[62] Division of Ser. No. 774,896, Mar. 7, 1977, Pat. No. 4,150,522.

[51] Int. Cl.³ .................... B23P 19/02; B23P 11/02
[52] U.S. Cl. ................................... 29/451; 29/235; 29/773; 29/DIG. 34
[58] Field of Search ............... 29/451, 773, 235, 778, 29/421 R, DIG. 44; 113/120 R, 120 P, 120 XY; 222/95, 402.18; 53/470

[56] References Cited

U.S. PATENT DOCUMENTS

| | | | |
|---|---|---|---|
| 2,847,959 | 8/1958 | Switzer | 29/421 X |
| 3,323,206 | 6/1967 | Clark | 53/470 X |
| 3,423,818 | 1/1969 | Ruekberg | 29/451 |
| 3,477,195 | 11/1969 | Chambers | 53/470 |
| 3,549,058 | 12/1970 | Boik | 29/451 X |
| 3,588,997 | 6/1971 | Field | 29/235 X |
| 3,938,708 | 2/1976 | Burger | 222/95 |
| 3,979,025 | 9/1976 | Friedrich | 222/95 |
| 4,045,860 | 9/1977 | Winckler | 29/451 |
| 4,153,182 | 5/1979 | Loeliger | 29/451 |

*Primary Examiner*—Charlie T. Moon
*Attorney, Agent, or Firm*—Smyth, Pavitt, Siegemund, Jones & Martella

[57] ABSTRACT

A method for pressurizing an aerosol dispensing system with propellant in which a flexible inner container is inserted within a rigid outer container. The mouth opening of the inner container, having flexible means thereon, extends outwardly through the neck opening of the outer container with the flexible means supported by the neck opening. A dispensing cap is moved into engagement with the flexible means and the dispensing cap and flexible means are moved away from the neck opening while propellant is then injected through the neck opening into the region between the inner and outer containers. The dispensing cap is moved into the neck opening and crimped into engagement therewith to fix the position of the flexible means and inner container while maintaining a space between the neck opening and a portion of the exterior surface of the dispensing cap during crimping.

5 Claims, 28 Drawing Figures

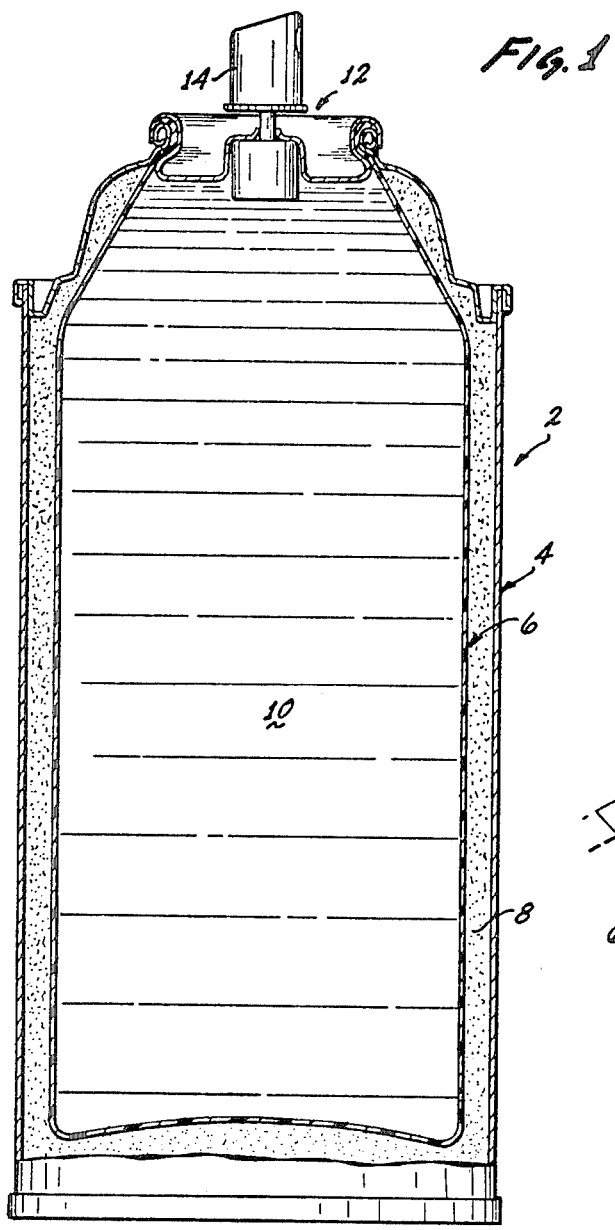
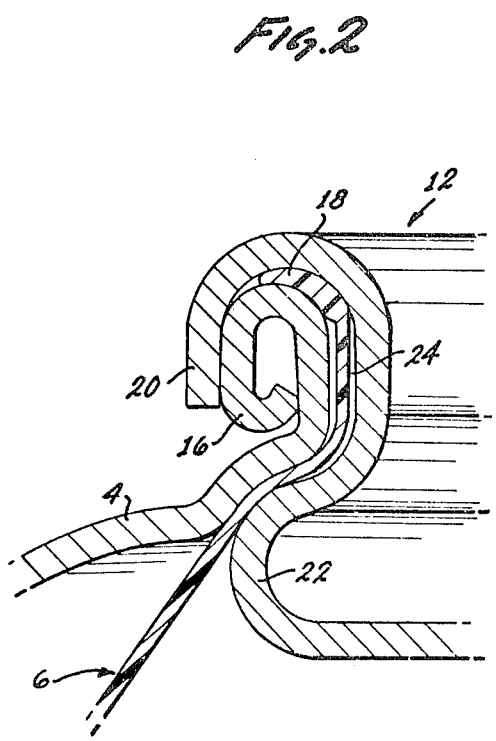
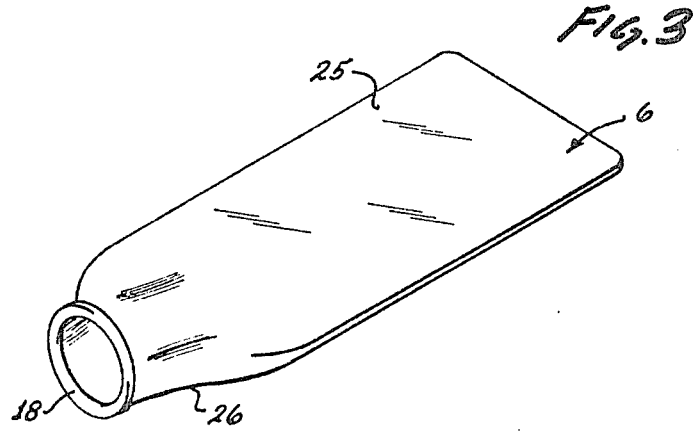

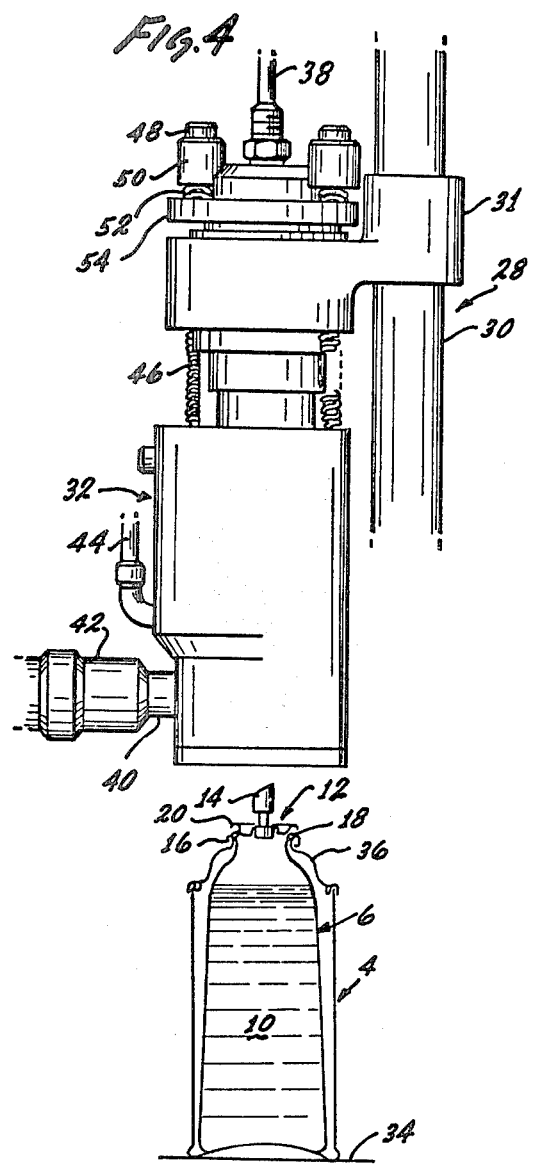
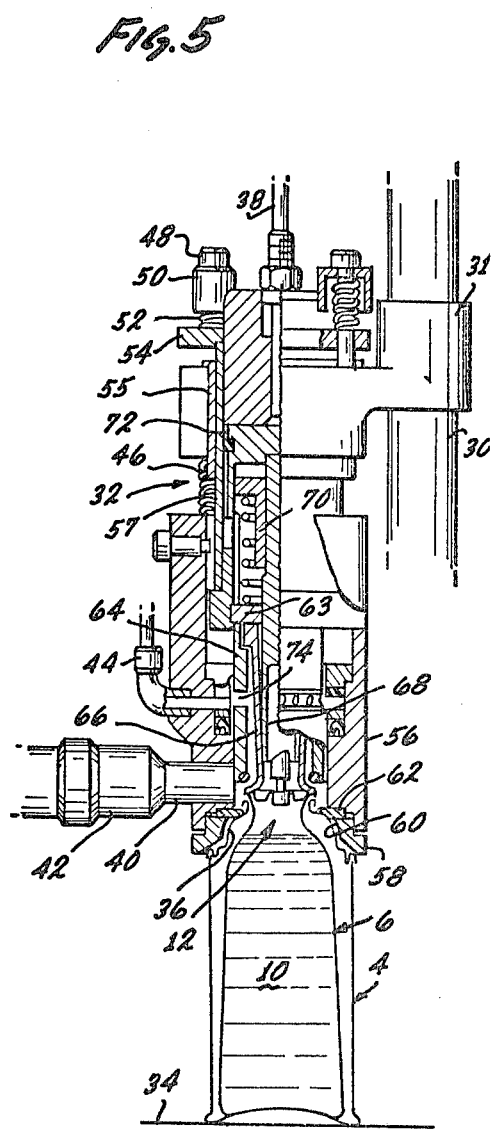
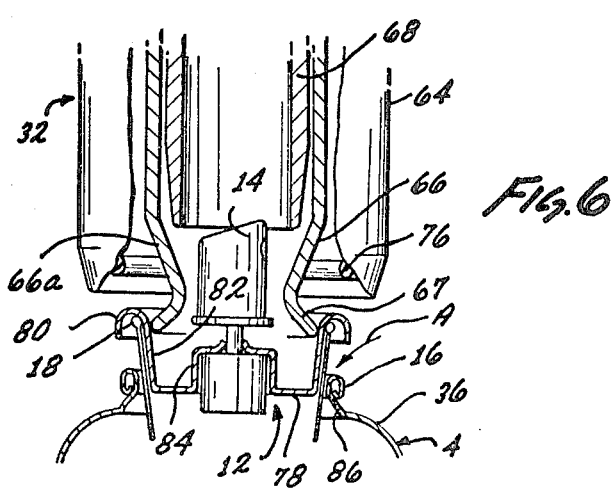

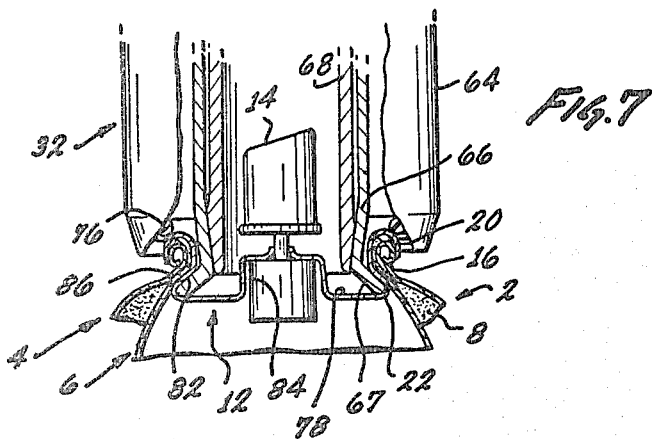
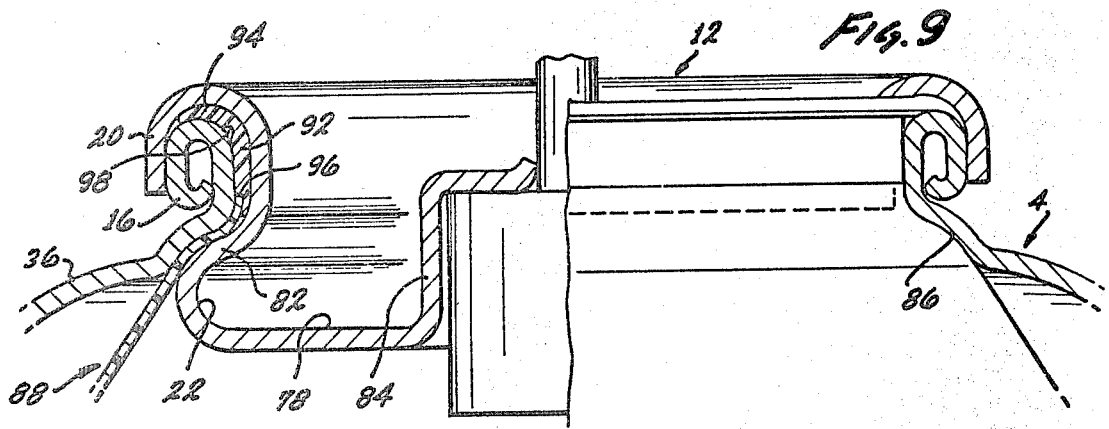
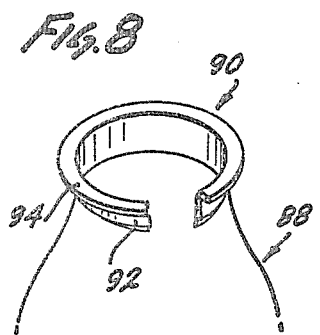
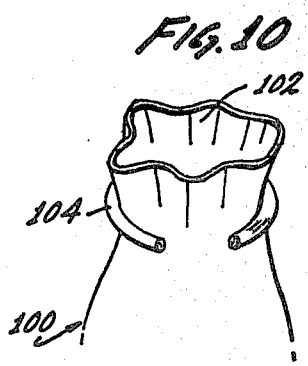
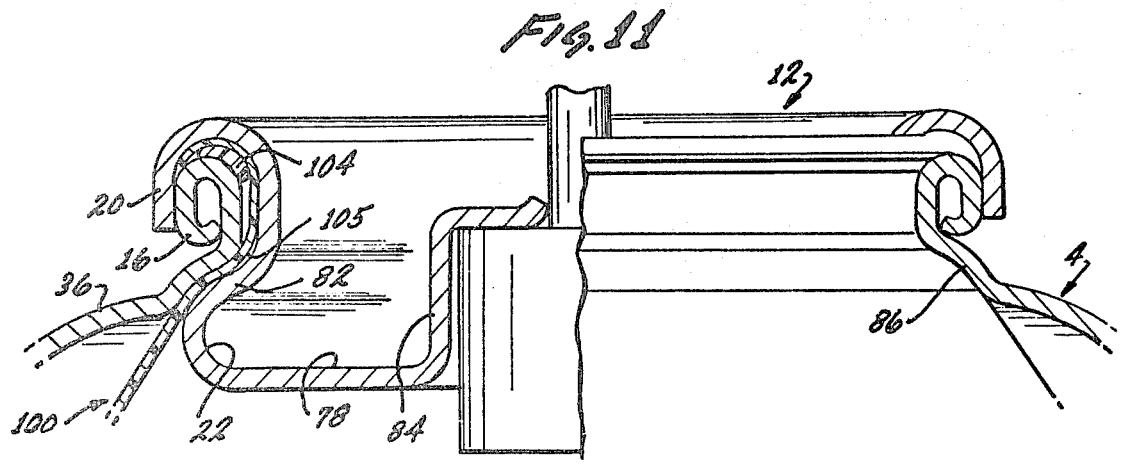

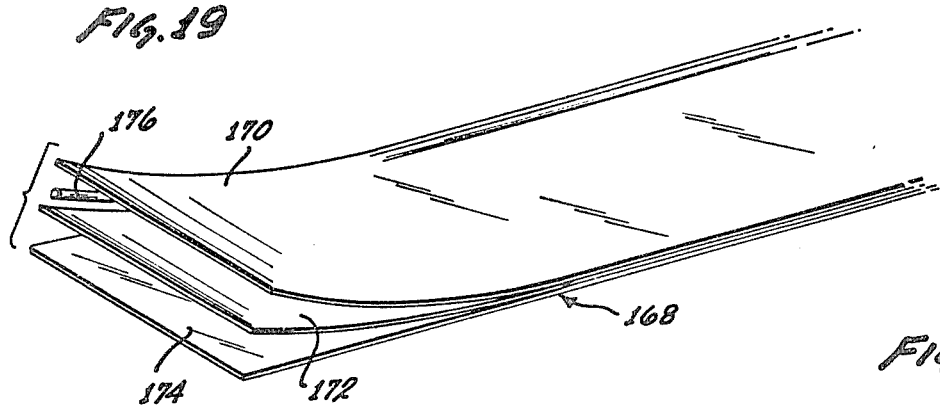
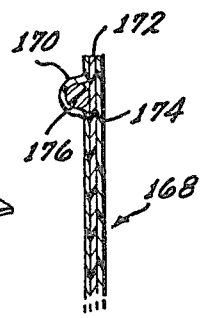
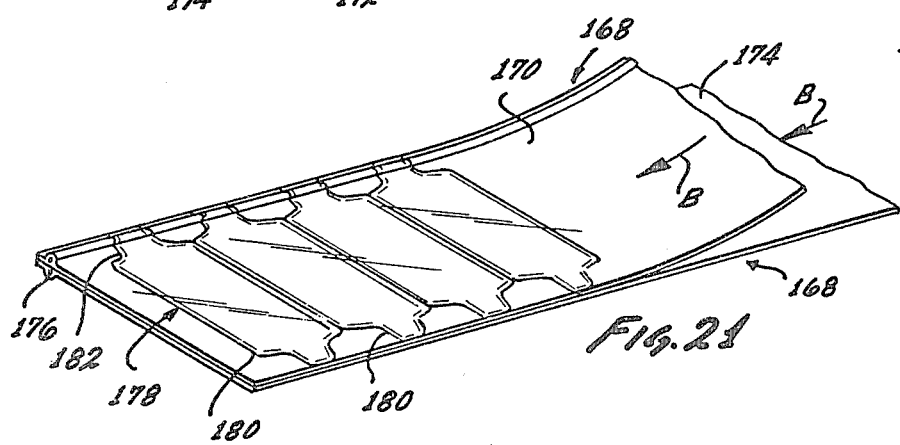
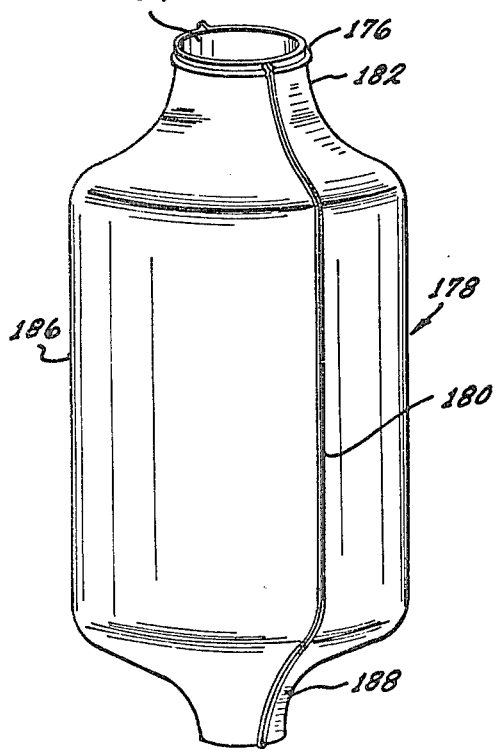
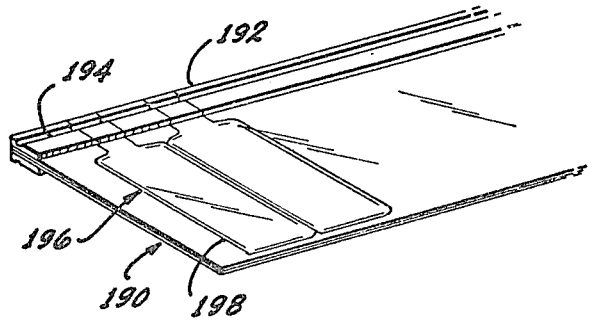
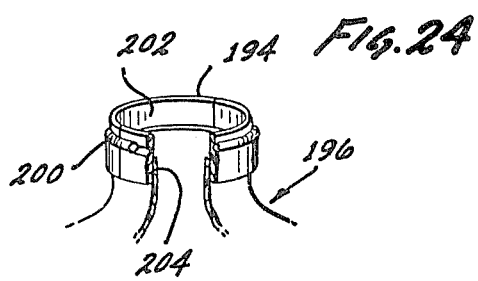

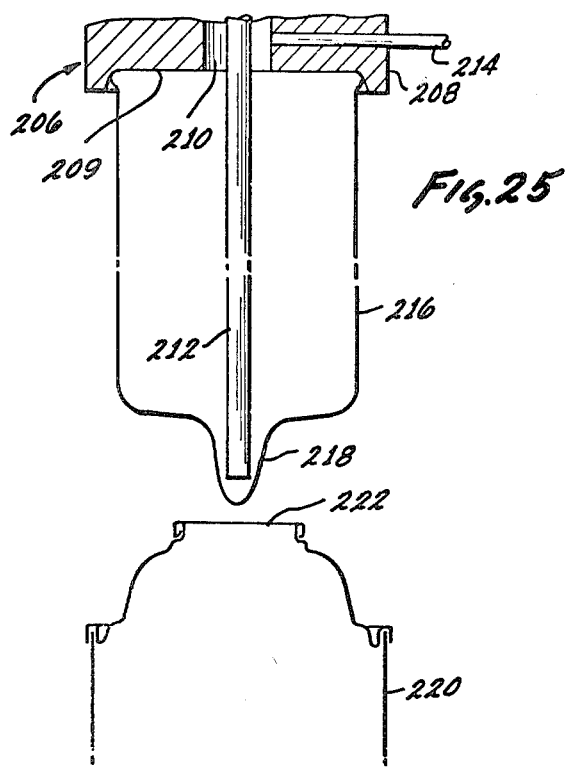
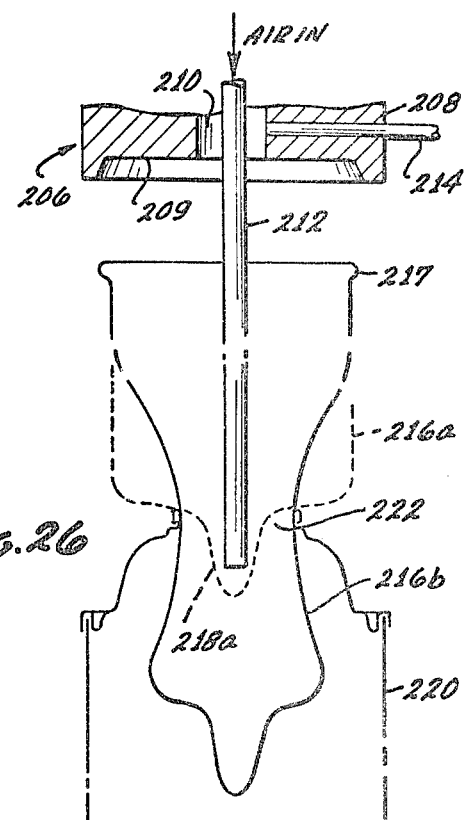
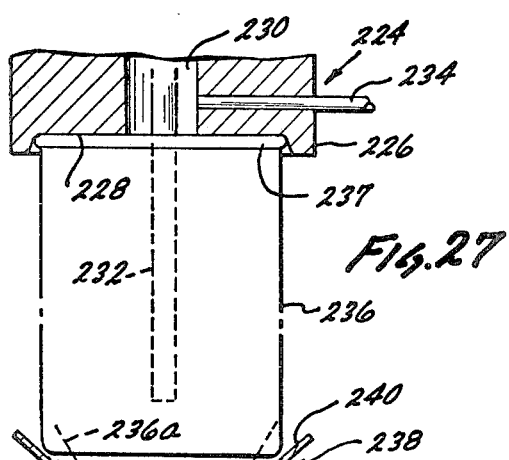
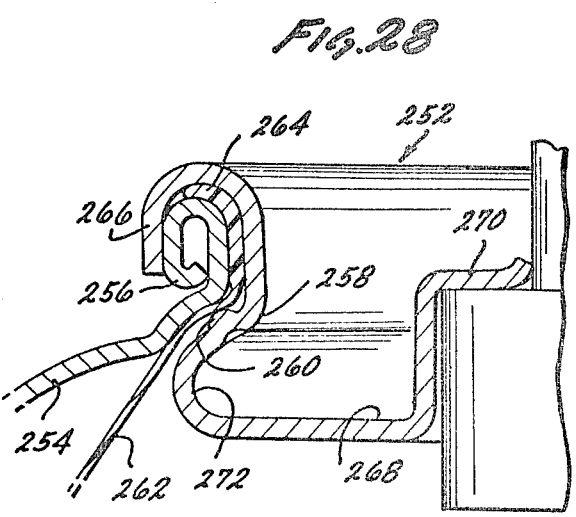

METHOD AND APPARATUS FOR INSERTING A FLEXIBLE INNER CONTAINER WITHIN A RIGID OUTER CONTAINER

RELATED APPLICATIONS

This application is a division of my prior copending U.S. Application Ser. No. 774,896, filed Mar. 7, 1977 now U.S. Pat. No. 4,150,422, issued Apr. 24, 1979.

BACKGROUND OF THE INVENTION

Aerosol dispensing systems are known in which a flexible inner product container is positioned within a rigid outer container with the flexible inner container serving to separate the product from the propellant. In this type of aerosol system, known as a barrier pack, the product may be contained in the flexible inner container with the aerosol propellant in the region between the exterior of the flexible inner container and the interior of the rigid outer container. A dispensing cap is in communication with the flexible inner container and, on opening a valve, product within the flexible inner container may be discharged through the dispensing cap by the propellant pressure on the exterior of the flexible inner container.

A principal disadvantage of barrier pack aerosol systems involves the expense and difficulty in pressurizing the system with propellant. This is presently accomplished by providing a valve closure in the rigid outer container. The outer container may then be pressurized, by inserting propellant through the valve closure into the region between the flexible inner container and the rigid outer container.

The present procedure for pressurizing a barrier pack aerosol system with propellant is generally unsuitable for the mass production of aerosol dispensing systems. In particular, the position of the fill applicator and the valve closure in the outer container must be precisely aligned when propellant is charged through the valve closure. Also, the fill applicator and valve closure must be maintained in alignment as propellant is being charged to the outer container, since relative movement between the valve and the fill applicator could result in damage to the outer container or the valve closure to produce leakage.

In view of the above difficulties in present procedures for pressurizing a barrier pack aerosol system with propellant, it would be desirable if a procedure could be devised which would permit rapidly charging propellant to a barrier pack aerosol system on a mass production basis. Additionally, it would be desirable if such a procedure could be carried out with existing filling equipment such as undercap filling apparatus which is presently used in charging propellant to a conventional aerosol system in which the product and the propellant are mixed together, and are not separated by an inner container.

SUMMARY OF THE INVENTION

In providing a solution to the aforementioned problems, I have devised a method for pressurizing barrier pack aerosol dispensing systems with propellant on a highspeed mass production basis. Additionally, this method can be carried out with conventional undercap filling apparatus, such that the use of the method will not entail large expenditures for new equipment.

In accord with the present method, a flexible inner container having a mouth opening is inserted within a rigid outer container with the mouth opening of the inner container extending outward through the neck opening of the outer container. The inner container includes flexible means which extend around the mouth opening with the flexible means being supported on the neck opening of the outer container. The dispensing cap for the aerosol container is then placed in alignment with the neck opening of the outer container. Following this, the dispensing cap is moved relative to the flexible means on the inner container to firmly grip the exterior surface of the dispensing cap with the flexible means. The dispensing cap is moved away from the neck opening of the outer container with the flexible means gripping the dispensing cap to expose the neck opening to provide access to the outer container in the region about the flexible inner container. Propellant is then ejected through the neck opening into the region between the exterior of the inner container and the interior of the outer container. The dispensing cap is then moved into the neck opening and the cap is fixed to the neck opening by crimping. During crimping, a gripping force is applied to the flexible means to fix the position of the flexible means and the inner container relative to the outer container by contact of the dispensing cap and the neck opening with the flexible means. During crimping, a space is provided between the neck opening and a portion of the surface of the dispensing cap to prevent tearing of the flexible inner container during crimping.

In addition to the above method for pressurizing a barrier pack aerosol system with propellant, the present invention provides a flexible inner product container having a particular suitability for use in the above method. The flexible inner container has a mouth opening with flexible means on the inner container at the mouth opening. The flexible means has a thickness which is greater than the thickness of the wall of the inner container and the flexible means is also shaped and positioned to rest on the neck opening of the outer container during assembly of the aerosol system. Additionally, the flexible means is shaped and positioned to grip the exterior surface of the dispensing cap when the cap is moved into the neck opening and into contact with the flexible means resting on the neck opening.

A method is also provided for inserting a flexible inner container through a neck opening of a rigid outer container during formation of an aerosol dispensing system. In accord with the method, the bottom surface of the flexible inner container is aligned with the neck opening of the rigid outer container. A pressure is then applied on the inner container to force the bottom surface of the inner container through the neck opening. The passage of the bottom surface through the neck opening, then, pulls the balance of the inner container through the neck opening except for flexible means on the mouth opening of the inner container which rests on the neck opening of the outer container.

Additionally, the present invention includes an apparatus for inserting a flexible inner container having a mouth opening through a neck opening of a rigid outer container in forming a barrier pack aerosol system. The apparatus includes means to support the flexible inner container with the mouth opening of the inner container in an opened condition. The apparatus also includes means to direct a stream of gas into the mouth opening of the flexible inner container so as to move the inner container in the direction of the gas stream which is directed away from the means for supporting the flexible inner container. The flexible inner container is, thereby, forced through the neck opening of the rigid outer container by the force of the stream of gas which is directed toward the neck opening.

THE DRAWINGS

In describing a preferred embodiment of the invention, reference is made to the accompanying drawings, in which:

FIG. 1 is an elevational view, partly in section, which illustrates an aerosol dispensing system produced according to the present invention;

FIG. 2 is a detailed sectional view through the dispensing cap of the aerosol dispensing system of FIG. 1;

FIG. 3 is a perspective view of a flexible inner container which may be used in the aerosol dispensing system shown in FIGS. 1 and 2;

FIG. 4 is an elevational view of an undercap filling machine which may be used in pressurizing a barrier pack aerosol dispensing system with propellant in accord with the present invention;

FIG. 5 is a sectional view of the crimper head of the undercap filling machine of FIG. 4 which illustrates the crimper head in vertical section, with the crimper head being lowered to a position in contact with the rigid outer container;

FIG. 6 is a detailed view of a portion of the lower end of the crimper head as illustrated in FIG. 5;

FIG. 7 is a partially sectioned elevational view, similar to FIG. 6, which demonstrates the positioning of the crimper head during crimping of the dispensing cap to the rigid outer container to secure the flexible inner container between the rigid outer container and the dispensing cap;

FIG. 8 is a fragmentary perspective view which illustrates a different embodiment of a flexible inner container that may be used in the practice of the invention;

FIG. 9 is an elevational view, partly in section, illustrating the inner container of FIG. 8 after being crimped in place between a dispensing cap and a rigid outer aerosol container;

FIG. 10 is a partial perspective view of a further embodiment of the invention in which a flexible ring is placed about the mouth of the flexible inner container in providing flexible means adjacent the container mouth;

FIG. 11 is a partially sectional elevational view, similar to FIG. 9 illustrating the flexible inner container of FIG. 10 after being fixed in position between a dispensing cap and a rigid outer aerosol container;

FIG. 19 is a perspective view illustrating the general manner in which several layers of a flexible plastic material may be joined together to form a flexible inner container for use in the present invention;

FIG. 20 is a cross-sectional view through the layered flexible material after its formation in the manner illustrated in FIG. 19;

FIG. 21 is a perspective view demonstrating the manner in which several sheets of layered flexible material may be combined to form a flexible inner container in which the sheets of flexible material are joined together by any conventional method such as heat sealing;

FIG. 22 is an elevational view of a flexible inner container produced according to the procedure illustrated in FIG. 21;

FIG. 23 is a perspective view, similar to FIG. 21, which illustrates a manufacturing procedure for forming another embodiment of a flexible inner container for use in the present invention in which several sheets of a layered flexible material are moved simultaneously in juxtaposed relation through a forming station;

FIG. 24 is a partial perspective view of the upper portion of a flexible container which is formed by the procedure of FIG. 23 with a closed flexible ring being positioned in snap-fitting engagement within a groove extending about the exterior surface of the flexible inner container and in close proximity to the mouth opening of the container;

FIG. 25 is an elevational view of a bag insertion mechanism for use in the present invention with the mechanism positioned above a rigid outer container and with a flexible inner container supported on the bag insertion mechanism;

FIG. 26 is an elevational view, similar to FIG. 25, which illustrates the functioning of the bag insertion mechanism during insertion of a flexible bag through a narrowed neck opening into a rigid outer container;

Figure 12:
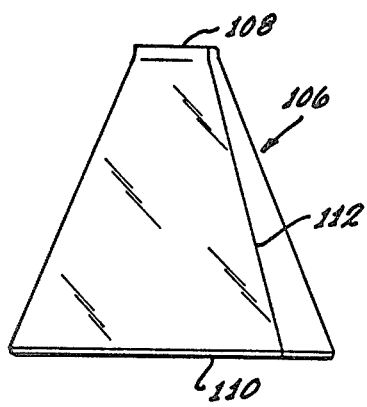
FIGS. 12, 13, 14, 15, 16, 17 and 18 are elevational views of different embodiments of flexible inner containers which may be utilized in the present invention.

FIG. 27 is an elevational view, similar to FIG. 26, which illustrates a different form of apparatus for inserting a flexible inner container through a narrowed neck opening into a rigid outer container with the flexible inner container being contacted by a positioning surface which guides the flexible inner container into the narrow neck opening of the outer container, and FIG. 28 is a partial section through the neck of a barrier pack aerosol container, illustrating the use of a container cap having deformations formed on the exterior surface of the cap to assist in the gripping of the exterior surface by flexible means positioned at the mouth of the flexible inner container.

DETAILED DESCRIPTION

FIG. 1 is an elevational view, partly in section, which illustrates an aerosol dispensing system 2 as produced according to the present invention. The aerosol dispensing system 2 includes a rigid outer container 4, a flexible inner container 6 within the outer container, and a primary propellant 8 in the space between the inner and outer containers. A product 10, which may include a neutral propellant in admixture therewith, may be retained within the flexible inner container 6 while a cap 12 is affixed to the outer container 4 to hold the inner container in a fixed position relative to the outer container. Additionally, the cap 12 may include a valve assembly and dispensing head 14, which are secured thereto. With application of pressure against the valve assembly and dispensing head 14, the product 10 can, thus, be discharged through the dispensing head under the influence of the compressive force exerted against the exterior of the flexible inner container 6 by the primary propellant 8.

The aerosol dispensing system 2, as generally described with respect to FIG. 1, is disclosed in greater detail in my prior U.S. Pat. No. 3,869,070, issued Mar. 4, 1975, and also in my prior U.S. Pat. No. 3,938,708, issued Feb. 17, 1976. The disclosures of my prior U.S. patents are incorporated herein by reference.

In addition to an aerosol dispensing system 2 of the type illustrated in FIG. 1, the method of the present invention may also be used for the production of aerosol dispensing systems of the prior art in which product material contained within inner container 6 is not dispensed in the form of a spray but, rather, is extruded in the form of a ribbon or tube. By way of example, a shaving cream formulation or a toothpaste formulation may be contained within the flexible inner container 6 with the valve and dispensing head 14 being replaced by a valve having a straight tube connected thereto for conducting product material which passes through the valve. On opening of the valve, the product material, such as shaving cream or toothpaste, may then be conveyed through the valve and straight tube as a solid ribbon which is ready for usage.

FIG. 2 is a detailed sectional view through the cap 12 as shown in FIG. 1, which illustrates the manner in which the cap may be utilized in holding the flexible inner container 6 in a fixed position relative to the rigid outer container 4. As illustrated, the rigid outer container 4 may have a narrowed neck 16 with a flexible ring 18, which may be formed integrally with the inner container 6, being clamped between the cap 12 and the neck. The cap 12 may include a crimped portion 20 which is in close-fitting engagement with the exterior surface of the neck 16 while an inner flared portion 22 is expanded radially outward into close proximity with the inner surface of outer container 4.

As indicated, the inner container 6, except for flexible ring 18, is not pinched between the surfaces of the cap 12 and outer container 4 since this could produce tearing of the material forming the flexible inner container during crimping of the cap to secure the cap to the neck 16. Rather, during crimping of the cap 12 to secure the cap to the neck 16, a space 24 is provided between the cap and neck which is sufficient to provide room for the material of the flexible inner container 6. This prevents tearing of the material which forms the wall of the inner container 6 and assures that the integrity of the inner container is maintained. The inner container 6 may, thus, function to retain product material therein, such as the product 10 shown in FIG. 1, and to separate the product material from the primary propellant, such as propellant 8, which exerts a compressive force against the exterior of the inner container.

FIG. 3 is a perspective view of the flexible inner container 6 which may be utilized in the aerosol dispensing system 2 shown in FIGS. 1 and 2. As illustrated, the flexible inner container 6 may include a body portion 25 having a generally uniform straight exterior configuration with the body portion leading to a tapered neck portion 26 which may terminate in flexible ring 18. As will be described, this configuration of the flexible inner container 6 facilitates the positioning of the inner container within a rigid outer container, such as outer container 4, with the inner container functioning to separate a product within the inner container from the primary propellant which bears against the exterior surface of the inner container. By reason of the construction of the flexible bag 6, as generally indicated in FIG. 3, the aerosol dispensing system may also be pressurized with propellant in a more expeditious manner which permits the use of a standard undercap filling apparatus in pressurizing the dispensing system with propellant.

The use of a standard undercap filling apparatus in pressurizing the present aerosol dispensing system with propellant is highly advantageous since undercap filling is used extensively in pressurizing conventional aerosol systems with propellant with the propellant being added directly to the product. During undercap filling, the aerosol container may be pressurized with propellant by a procedure in which the container cap is lifted from the mouth of the container with propellant then being charged to the space beneath the cap and the cap being crimped to fix the cap in sealing relation to the mouth of the container.

Previously, in barrier-pack aerosol containers having a flexible inner container positioned within a rigid outer container, it has been necessary to pressurize the outer container with a propellant by a laborious procedure which considerably increases the overall cost of the aerosol system. Previously, the flexible inner barrier-pack container was first joined to the mouth of a rigid outer container by a container cap. Following this, a propellant was inserted between the flexible inner container and the rigid outer container through a valve closure in the bottom of the outer container by the use of a fill applicator. As will be appreciated, the use of a fill applicator and valve closure to pressurize an aerosol container is not conducive to high production operation and the cost of the valve closure increases the cost of the outer container. During filling, the positions of the fill applicator and the valve closure must be aligned to prevent damage to the outer container or the valve closure. This may increase the time required to charge an aerosol container with propellant which may, therefore, increase production time and production costs.

FIG. 4 is an elevational view of an undercap filling machine 28 which may be used in pressurizing barrier pack containers with propellant in accord with the present invention. The portion of an undercap filling machine 28 which is shown in FIG. 4 may include a post 30 having a support bracket 31 attached thereto which supports a crimper head 32. Positioned beneath the crimper head 32 is a platform 34 having an outer container 4 resting thereon with a fexible inner container, 6, which may contain product, being supported within the outer container. A complete undercap filling machine may comprise a plurality of crimper heads 32 which are supported by a corresponding plurality of posts 30. Each crimper head 32 may have a platform 34 associated therewith with movement of a crimper head performing work on an aerosol container which is supported with respect to the crimper head by the platform. By way of example, a plurality of crimper heads 32 and the platforms 34 may move in a generally circular path with the circular movement of each crimper head being synchronized with the movement of the platform 34 and an outer container 4, which is supported thereby with respect to the crimper head. During the synchronized circular movement of the crimper head 32 and platform 34, the crimper head may then undergo relative movement with respect to the platform 34 such that the crimper head may perform a working operation with respect to the aerosol container.

With reference to FIG. 4, the outer container 4 includes a curved transition surface 36 which generally interconnects the larger diameter portion of the outer container with the container neck 16. As will be described, a positive seal is established between the curved transition surface 36 and the crimper head 32 such that a source of vacuum or a source of propellant pressure may be transmitted from the crimper head to the annular region which is bounded by the inner surface of the container 4 and the outer surface of inner container 6. In this manner, the outer container 4 may be charged with propellant in a more expeditious manner which does not require use of a filling needle or a sealed filling aperture for insertion of a filling needle during charging of the container with propellant.

As indicated, a number of fluid lines may lead to the crimper head 32 such as a hydraulic line 38 and a propellant line 40 having a valve 42 therein. Further, a vacuum line 44 may lead to the crimper head 32 to impose a vacuum upon the outer container 4 in evacuating the outer container prior to the charging of propellant thereto. As described, the undercap filling machine 28 of which a portion is described in FIG. 4 is a standard undercap filling machine of the type which is widely used in pressurizing conventional aerosol dispensing containers with propellant. The particular construction of the undercap filling machine 28, thus, does not form a part of the present invention. However, the description of the undercap filling machine 28 is included herein as necessary background information since one feature of the present invention is the application of a standard undercap filling machine to the pressurizing of a barrier pack container with propellant.

As will be described, the component parts of the undercap filling machine 28 or crimper head 32 may be moveable with respect to each other. Accordingly, compression springs 46 may be positioned between the several parts of the crimper head 32 to hold the parts in a spaced-apart relation. Additionally, pressure posts 48 having enlargements or stops 50 thereon are in contact with pressure pad springs 52 which bear against a pressure pad 54. The component parts of the crimper head 32 are shown in greater detail in FIG. 5 which is a vertical sectional view of the crimper head in lowered position in contact with the outer container 4.

To position the crimper head 32 as shown in FIG. 5, the post 30 and bracket 31 may be moved downwardly relative to the platform 34. Support members 55 and 57 may be spring biased downwardly under the influence of pressure pad 54 and the pressure pad springs 52 may also move downwardly through the movement of support bracket 31. An outer bell 56 which is held in spaced relation from support bracket 31 by compression springs 46 may also be moved downwardly with movement of the post 30 with a can locator 58 being formed at the lower end of the outer bell. The can locator 58 may define a sealing surface 60 thereon which corresponds to the curved transition surface 36 that is formed on the outer container 4. Additionally, the sealing surface 60 may include a flexible gasket 62 thereon which makes contact with the curved transition surface 36 on the downward movement of outer bell 56. This forms a fluid-tight seal between the gasket 62 and the transition surface 36 such that vacuum and pressure may be communicated to the interior of the outer container 4 from the crimping head 32.

Downward movement of the post 30 and support bracket 31 may be communicated to the support member 55 and, in turn, to support member 57. From support member 57, the downward movement may then be transmitted through a sliding member 63 to an inner bell 64 such that downward movement of the post 30 produces downward movement of the inner bell.

On contact of the sealing surface 60 with the curved transition surface 36, the downward movement of the outer bell 56 ceases. However, the inner bell 64 continues its downward movement to provide relative movement between the inner bell and the outer bell 56 with compression of the springs 46. On continued downward movement of inner bell 64, an expandable collet 66 carried by the inner bell is brought into contact with the upper surface of cap 12. This forces the cap 12 downwardly from its position shown in FIG. 4 such that the flexible ring 18 is pushed upwardly into tight-fitting engagement with the exterior surface of the cap. Following this, a vacuum port 74 in the inner bell 64 is moved into alignment with the vacuum line 44. This, then, applies a vacuum to the upper surface of cap 12 which pulls the cap upwardly away from the neck 16 of container 4. With this upward movement of cap 12, the annular space between the interior surface of container 4 and the exterior surface of container 6 is exposed to vacuum which causes the inner container to expand while, at the same time, the space between the inner container and the outer container is evacuated.

As illustrated in FIG. 6, which is a detail view of a portion of the lower end of crimper head 32, the continued downward movement of inner bell 64 from its position in FIG. 6 may move a seal 76 which is carried by the inner bell into contact with cap 12. As this occurs, the collet segments 66a which are flexible, may be deflected inwardly from their position shown in FIG. 6 while collet fingers 67 are moved downwardly along the inner surface of cap 12. During downward movement of the inner bell 64, a plunger 68, a plunger return spring 70 and a piston 72 may also undergo downward movement with the inner bell.

As illustrated, the cap 12 may include a bottom surface 78, ears 80 where the curvature of the outer surface of the cap is reversed, and an outwardly-tapered sidewall 82. With the flexible ring 18 resting on the container neck 16 as shown in FIG. 4, downward movement of the cap 12 may push the ring against the outwardly-tapered sidewall 82 which causes the ring to expand as it is moved upwardly relative to the sidewall. The extent of movement of the ring 18 relative to the cap 12 may be determined by the position of the ears 80 since, as shown, the contact of the ears with the ring may terminate the movement of the flexible ring with respect to the sidewall 82. To provide support for the valve assembly and dispensing head 14, a center portion 84 of the bottom surface 78 may be recessed with the valve assembly being secured within the recess.

With downward movement of the inner bell 64 into contact with the cap 12, as described, the vacuum port 74 (see FIG. 5) may be moved to a position which is out of alignment with the vacuum line 44. This may then terminate the transmission of a vacuum to the container 4. Also, the movement of the seal 76 into contact with the ears 80 of cap 12, as described, may form a closure which seals the vacuum port 74 from the interior of the container 4.

After cutting off the vacuum to the outer container 4, the outer container may then be pressurized with propellant by opening the valve 42 on propellant line 40. The sealing surface 60 provided by outer bell 56 (not shown in FIG. 6) remains in contact with the curved transition surface 36 to form a seal between the crimper head 32 and the outer container 4. Thus, propellant may flow from propellant line 40, beneath the raised cap 12 and inner container 6, and into the outer container 4 as indicated by the arrow A. In this manner, propellant may be directly introduced into the outer container 4 by undercap filling. As indicated, the curvature of the outer container 4 undergoes a relatively sharp change in the region between the curved transition surface 36 and the container neck 16. This change is accommodated by a conically-tapered surface 36 which joins the transition surface 36 to container neck 16.

During the pressurization of container 4 with propellant, the force of the propellant may exert an upward force against the cap 12 with the ears 80 of the cap contacted by the seal 76 to form a closure therewith, i.e., with the inner bell 64 moved downwardly from its position shown in FIG. 6 relative to the cap 12. This force may be relieved by upward movement of the inner bell 64 which may be transmitted through the member 63 to piston 72 and to the support member 57. The upward movement of support member 57 may then be transmitted to pressure pad 54 which may move upwardly by compression of the springs 52 positioned between the pressure pad and the enlargements 50.

FIG. 7 is a partially sectioned elevational view, similar to FIG. 6, which demonstrates the positioning of crimper head 32 during crimping of the cap 12 to the outer container 4 while securing the inner container 6 between the outer container and the cap. As indicated, the cap 12 is sealed to the outer container 4 by moving the inner bell 64 against the upper surface of cap 12 while also moving the plunger 68 downwardly relative to the inner bell to expand the collet 66 and to force the collet fingers 67 outwardly against the interior surface of the cap.

In providing downward movement of plunger 68 relative to the expandable collet 66, hydraulic fluid may be supplied to the crimper head 32 through line 38 as shown in FIG. 5. After passing through line 38, the hydraulic fluid entering crimper head 32 may bear against the upper surface of piston 72 which is directly connected to the plunger 68. As the piston 72 is forced downwardly, the plunger 68 may, thus, undergo relative movement with respect to the collet 66. This may expand the collet 66 and force the collet fingers 67 into contact with the inner surface of cap 12 to expand the cap surface outwardly into close proximity with the inner surface of container 4.

After crimping the cap 12, as illustrated in FIG. 7, hydraulic fluid may be withdrawn through line 38 by diverting the fluid to a sump. On the removal of hydraulic pressure from the upper surface of piston 72, the piston may undergo upward movement to its position shown generally in FIG. 5 under the influence of a plunger return spring 70. At this point the completed aerosol dispensing system 2 (see FIG. 1) may be removed from beneath the crimper head 32 and a new container 4, cap 12, inner container 6, etc., (as shown in FIG. 4) may be placed beneath the crimper head. Following this, the whole operation may be repeated to seal a new inner container 6 to a new outer container 4 and to pressurize the new outer container with propellant.

FIG. 8 is a fragmentary perspective view which illustrates a different type of flexible inner container 88 that may be used in the practice of the invention. The inner container 88 includes a flexible sealing flange 90 which may be integrally formed with the flexible inner container. The sealing flange 90 may include a sidewall portion 92 having a flanged portion 94 connected thereto. In the use of the flexible sealing flange 90, the flexible inner container 88 is firmly engaged with the exterior surface of cap 12 such that the sealing flange occupies the general position illustrated in FIG. 6 with respect to the cap. Through contact of the sealing flange 90 with the exterior surface of cap 12, the flexible inner container 88 may then be raised away from the outer container 4. This permits undercap pressurization of container 4 with propellant as illustrated by the arrow A in FIG. 6. This, then, permits the use of a conventional undercap filling apparatus in pressurizing the container 4 that avoids the laborious procedure previously employed in which propellant was inserted in the outer container through a valve closure formed in the container bottom.

FIG. 9 is an elevational view, partly in section, which illustrates a cap 12 that is crimped onto a container neck 16 with the flexible inner container 88 being held between the cap and the outer container 4. During crimping of the cap 12 to the outer container 4, the sealing flange 90 undergoes deformation, in which the sidewall portion 92 and the flanged portion 94 are in general alignment in the region between the outer container 4 and the cap 12. The sealing flange 90 may, as indicated, be joined to the flexible inner container 88 along a joining line 96. The flanged portion 94 may then be joined to the sidewall portion 92 along a flex line 98 such that the sidewall portion and flanged portion may undergo relative movement along the flex line during crimping of the cap 12 to the neck 16 of container 4.

FIG. 10 is a partial perspective view of a further embodiment in which a flexible ring is simply placed about the mouth of a flexible inner container. As illustrated, a flexible inner container 100 may include a mouth 102 with a separate ring 104 being positioned about the inner container adjacent to the mouth. In the use of the flexible inner container 100, the inner container, then, may be joined between a cap 12 and outer container 4 as illustrated in partially sectioned elevational view in FIG. 11.

Prior to crimping of the cap 12 as shown in FIG. 11, the flexible ring 104 is first moved relative to the exterior surface of an uncrimped cap such that the inner container 100 is firmly connected to the exterior surface of the cap. Subsequently, the container may be pressurized with propellant through undercap pressurization. This is generally illustrated in FIG. 6. Following this, the cap may be crimped in the matter generally described, in regard to FIG. 7. During crimping, the separate flexible ring 104 may be deformed by being positioned between the cap 12 and container neck 16. Deformation of the ring 104 may assist in holding the flexible inner container 100 between the cap 12 and the outer container 4. Also, as described previously, in crimping the cap 12, a space 105 is provided between the cap and the outer container 4. The space 105 insures that the material which forms the inner container 100 is not torn by relative contacting movement of the cap 12 and the outer container 4 during crimping of the cap.

In the formation of a pressurized barrier-pack aerosol system in accord with the present invention, a flexible inner container, such as container 6 shown in FIGS. 1 and 3, is inserted into a rigid outer container 4 through a narrowed neck opening 16. Accordingly, one aspect of the present invention is to provide a flexible inner container, whose configuration assists in the insertion of the inner container through a narrowed neck opening into a rigid outer container. Previous barrier-pack aerosol systems have not used a flexible inner container of this type, since previous systems have been charged with propellant through a valve closure located in the bottom of the outer rigid container. Thus, in previous barrier-pack aerosol systems a flexible inner container was joined with a rigid outer container at a time prior to the addition of a bottom wall to the rigid outer container. At this point in time, the outer container comprised only of a shell having an open bottom and the flexible container could be readily inserted within the rigid outer container with the inner container and outer container then being joined together by a cap crimped within the neck opening to the rigid outer container. Following this, the bottom wall of the outer container was connected thereto in any conventional manner with the bottom wall having a valve closure therein for pressurization of the outer container.

In addition to having a shape which permits its insertion through a narrowed neck opening of an outer container, it is also desirable that a flexible inner container, as used in the present invention, have a shape that lends itself to mass production. As shown in elevational view in FIG. 12, a conical flexible container 106 may be provided which has a narrowed mouth 108 and an enlarged bottom 110. The sidewall of the conical container 106 may simply be rolled to form a conical configuration with the sidewall ends being joined together along a seam 112. In forming the seam 112 as well as a seam or seams along the bottom 110, the seams may be formed by heat-sealing, by an adhesive, or in any suitable manner. As presently contemplated, heat-sealing is a preferred mode of manufacture since seams may be formed instantaneously through heat-sealing which makes this procedure particularly suitable for a mass production operation.

Figure 13:
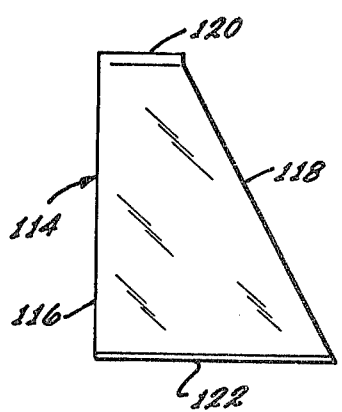

FIG. 13 is an elevational view of a triangular flexible container 114 which may have a straight side 116 and an angled side 118 which converge to form a narrowed neck 120. Additionally, the flexible container 114 may include an enlarged bottom 122. As in the case of the container 106 described in FIG. 12, the flexible container 114 may have seams which are formed through heat-sealing, the use of adhesives, etc.

Figure 14:
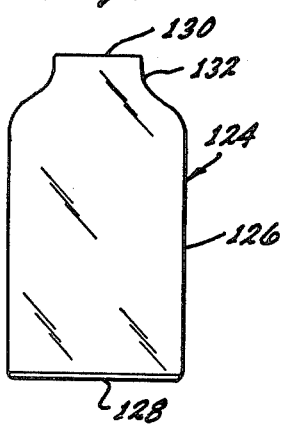

FIG. 14 is an elevational view of still a different type of flexible container 124 which may be utilized in accord with the present invention. The flexible container 124 may include a relatively straight cylindrical sidewall 126 and a flat enlarged bottom 128. Additionally, the sidewall 126 may lead to a narrowed neck 130 through a curved transition surface 132.

Figure 15:
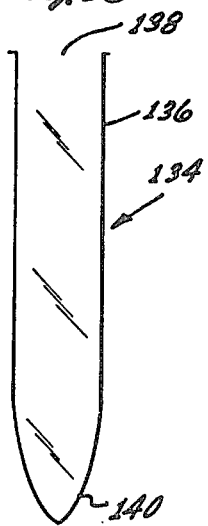

FIG. 15 is an elevational view of a still further embodiment of a flexible inner container 134 which may include a relatively straight cylindrical sidewall 136 leading to a mouth opening 138. The straight sidewall 136 may also lead to a pointed end 140 which is particularly suitable for insertion of the flexible container 134 through a narrowed neck opening of a rigid outer container.

Figure 16:
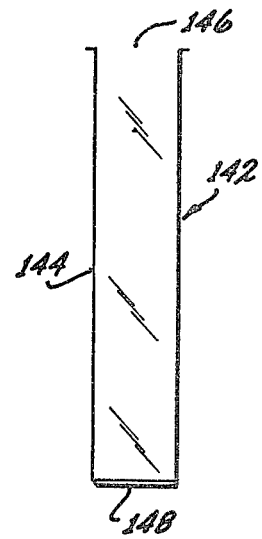

FIG. 16 is an elevational view of a flexible inner container 142 which is similar in shape to the container 134 described in regard to FIG. 15. The inner container 142 may include a generally straight cylindrical sidewall 144 which leads to a mouth opening 246. The bottom of the inner container 142 may then be closed by a flat bottom surface 148.

Figure 17:
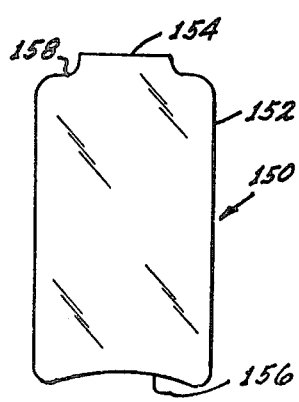

Still another form of a flexible container 150 is illustrated in elevational view in FIG. 17. As shown, the flexible inner container 150 may include a generally straight cylindrical sidewall 152 leading to a neck opening 154 with the container having an upwardly dished bottom surface 156. The generally straight sidewall 152 may be connected to the neck opening 154 through a curved transition surface 158.

Figure 18:
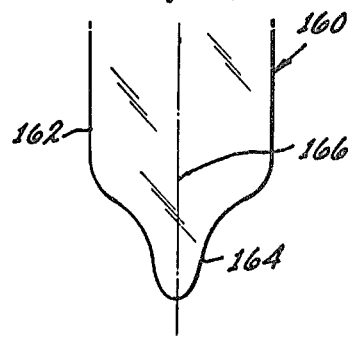

In inserting a flexible inner container through a narrowed neck opening of a rigid outer container, an inner container 160 of the type illustrated in partial elevational view in FIG. 18 may be quite useful. As indicated, the inner container 160 may include a generally straight cylindrical sidewall 162 which leads to an inserting tip 162 that may be positioned generally along the container axis 166. During insertion of the inner container 160 through a narrowed neck opening of a rigid outer container, the inserting tip 164 may be used to initiate the insertion of the flexible container. Since the tip 164 is of a smaller size than the main body of container 160, the tip may be more readily inserted through a narrowed neck opening than the main body. Also the inserting tip 164 may be positioned along the container axis 166 so that the inserting tip may be used to guide the balance of the inner container 160 into a narrowed neck opening of a rigid outer container.

FIG. 19 is a perspective view which illustrates the general manner in which several layers of a flexible plastic material may be joined together to form a flexible inner container as described previously. As illustrated, a layered flexible material 168 may be formed by superimposing separate layers 170, 172 and 174 of flexible material which may be joined together to form the layered flexible material. By using multiple layers of flexible material, such as the layers 170, 172 and 174, an increased level of quality control may be provided since the use of multiple layers may reduce the possibility of a defect which would extend entirely through the layered material 168. Moreover, by using several layers of flexible material, such as layers 170 and 172, an integral sealing ring may be formed within the layered flexible material 168 by enclosing a ring 176 between several of the layers, such as layers 170 and 172.

With the flexible ring 176 encapsulated between layers 170 and 172, the ring may have the general appearance shown in FIG. 20 which is a cross-sectional view through the layered flexible material 168 after its formation. In forming the separate layers 170, 172 and 174 into layered material 168, the separate layers may be passed between heated rolls which press the layers into sealing contact. The layers 170, 172 and 174 may also be sealed together, for example, through the use of an adhesive which may be placed between the separate layers with the layers then being brought into contacting relation such that the adhesive produces a seal between the layers. The particular manner in which several layers of flexible material may be joined together to form a flexible layered composite material is not essential to the present invention. Thus, any suitable means may be used to join the several flexible layers together to form a flexible layered composite material.

FIG. 21 is a perspective view illustrating the manner in which several sheets of a layered flexible material 168 may be combined in the formation of flexible inner containers 178. As illustrated, each of the sheets of layered flexible material 168 may be moved in the direction indicated by the arrows B with the layered sheets, thus, being moved in a juxtaposed relation at substantially the same speed through a forming zone.

As the two sheets of layered flexible material 168 are moved simultaneously in juxtaposed relation in the direction of arrow B, the two sheets may be passed over a supporting surface with a heated forming member being positioned above the surface for reciprocating movement into and away from the plane of the supporting surface. In contacting the layered sheets of flexible material 168 with the forming member, the forming member may, for example, be in the form of a rotatable roll in which portions of the roll surface are heated with the heated portions being brought into contact with the sheets of flexible material 168 as the material is moved across the face of the rotating roll.

Depending upon the position of the extremities of the flexible inner containers 178, the outline of the inner containers may extend completely across the width of the sheets of flexible material 168. Preferably, however, the outline of the flexible inner containers 178 does not extend completely across the width of the sheets 168 so as to provide a residual strip of material along either edge of the sheets. Thus, the sheets 168 may not be completely severed across their widths along the outlines of the flexible inner containers 178. This, then, may permit the sheets of flexible material 168 to be pulled through a forming station where the flexible inner containers 178 may be formed as cutouts from the sheets. In forming flexible containers 178, the heated forming member may contact the sheets of flexible material 168 along lines 180. In addition to heat-sealing the sheets 168 along lines 180, the forming member may be sufficiently hot to also sever the sheets 168 along cut lines which may be positioned along the centers of the lines 180.

Also, the cutting of the heat-sealed sheets of material 168 in forming flexible containers 178 may be a separate operation which has nothing to do with the heat-sealing operation. Thus, after heat-sealing the sheets 168 in the manner described to form the heat-sealed outlines of flexible containers 178, the containers may be separated from the sheets by severing the sheets along cut lines passing through the heat-seal lines 180.

The flexible inner containers 178, as indicated in FIG. 21, may include a narrowed neck portion 182. The flexible inner container 178 is illustrated in elevational view in FIG. 22. As shown, the neck portion 182 may lead to a mouth opening 184 with the flexible ring 176 extending about the neck portion in close proximity to the mouth opening. The main body of the flexible inner container 178 may be formed with a straight, generally cylindrical sidewall 186. However, for ease in the insertion of flexible inner container 178 through a narrowed neck opening into an outer container, the straight sidewall 186 may lead to a centrally positioned inserting tip 188. The inserting tip 188 may be useful in initiating the insertion of the flexible inner container 178 through a narrowed neck opening of a rigid outer container. Thus, after placing the inserting tip 188 through a narrowed neck opening of a rigid outer container, the inserting tip may then serve to pull the remainder of the flexible inner container 178 through the neck opening in the outer container.

FIG. 23 is a perspective view, similar to FIG. 21, which illustrates a manufacturing procedure for another form of a flexible inner container in which several sheets of a layered flexible material 190 (similar to layered material 168 as shown in FIG. 21) may be moved in juxtaposed relation through a forming station. The several sheets of layered material may each include a reinforcing layer 192 which may function in securing the inner container to the exterior surface of a cap so that the propellant may be placed within a rigid outer container by an undercap filling procedure. Additionally, each of the reinforcing layers 192 may have a groove 194 therein with flexible inner containers 196 being formed by heat sealing or joining the sheets of layered material 190 together in any suitable fashion along lines 198 to form the outline of the flexible inner containers.

FIG. 24 is a partial perspective view of the upper portion of a flexible container 196 that may be formed in the manner described in FIG. 23. A closed flexible ring 200 may be positioned in snap-fitting engagement within the groove 194 on the exterior surface of the reinforcing layer 192. The ring 200, thus, may be positioned closely adjacent to container mouth opening 202 while the reinforcing layer 192 is joined to the balance of the container 196 along a joining line 204. The combination of a flexible ring 200 coupled with the reinforcing layer 192 is suitable for engaging the mouth opening 202 in tight-fitting engagement with the exterior surface of a container cap. As discussed previously, this permits the flexible inner container 196 to be raised, along with a container cap, away from a rigid outer container. This permits pressurizing the rigid outer container by an undercap filling procedure.

As described previously, one aspect of the present invention involves the insertion of a flexible inner container within the interior of a rigid outer container. Unlike previous procedures used in the manufacture of barrier-pack aerosol systems, the procedure of the present invention improves manufacturing efficiencies so that barrier-pack aerosol systems can be manufactured at a cost that is only slightly higher than the cost of manufacturing a conventional aerosol dispensing system. To accomplish this result, a means may be provided for inserting a flexible inner container through a narrowed neck opening into a rigid outer container with the mouth opening of the flexible inner container then resting on the neck opening of the outer rigid container. As described previously, this places the flexible inner container in position for contact by the cap for the aerosol dispensing system such that the cap and flexible inner container may be raised away from neck opening to permit undercap pressurization of the outer container with propellant. By pressurizing the outer container in this manner, the outer container may be pressurized by the use of conventional undercap filling apparatus. This greatly reduces the cost of manufacturing barrier-pack aerosol dispensing systems which previously have required that the outer container be filled through a flexible seal in the bottom of the outer container by the insertion therein of a filling needle.

FIG. 25 is an elevational view which illustrates a bag insertion mechanism positioned above a rigid outer container with a flexible inner container supported on the bag insertion mechanism. A bag inserter 206 may include a head 208 having a relieved lower face 209 and a bore 210. Positioned within the bore 210 is a pressure probe 212 which may extend downwardly to a point below the relieved face 209. A vacuum line 214 may lead to the bore 210 such that the head 208 may be used in picking up a flexible container 216 or bringing the relieved face 209 into close proximity with a mouth opening for the flexible container. The mouth opening for the flexible container 216 may, thus, be held against the relieved face 209 under the influence of a vacuum drawn through the line 214. As this occurs, the flexible inner container 216 may be held in an extended position through contact with the pressure probe 212 with the lower portion of the flexible inner container terminating in inserting tip 218.

The bag inserter 206 with the flexible inner container 216 positioned thereon, as described, may then be placed above a rigid outer container 200 having a narrowed neck opening 222. In this position the inserting tip 218 may be placed above a rigid outer container 200 having a narrowed neck opening 222. In this position, the inserting tip 218 may be placed within the neck opening 222 with the neck opening serving as a target while the inserting tip functions as a projectile.

FIG. 26 is an elevational view, similar to FIG. 25, which illustrates the functioning of the bag inserter 206 as the flexible bag 216 is inserted through the narrowed neck opening 222 into rigid outer container 220. To insert the flexible inner container 216 within the rigid outer container 220, pressurized air may be admitted into the probe 212. This may then force the flexible inner container 216 away from the relieved face 209 such that the flexible inner container then occupies the position indicated as 216a.

With the container occupying position 216a, the inserting tip may occupy position 218a to extend into the neck opening 222. During movement of the flexible inner container 216 into the rigid outer container 220, the inner container may then occupy the position indicated as 216b in which the flexible inner container has moved partially into the interior of the outer container 220. Subsequently, the flexible inner container moves completely into the interior of the rigid outer container 220 with the inner container then occupying the position indicated as 216c. In position 216c, the inner container is positioned within the outer container 220 while a flexible ring 217 or similar structure that may be formed integrally with the flexible inner container rests on the periphery of the narrowed neck opening 222. At this point, the flexible inner container may be filled with product in a conventional manner simply by injecting the product through the mouth opening of the inner container. Following this, the flexible ring 217 may be engaged with the exterior surface of a container cap with the cap and flexible container 216 being moved in an upward direction away from the narrowed neck opening 222. At this point, the rigid outer container 220 may be pressurized with propellant by an undercap filling procedure in which propellant passes beneath the raised container cap and the raised portion of the flexible container 216 into the space between the inner container and outer container.

FIG. 27 is an elevational view, similar to FIG. 26, which illustrates a different form of apparatus for insertion of a flexible inner container through a narrowed neck opening into a rigid outer container. As illustrated, a bag inserter 224 may include a head 226 having a relieved lower face 228. The head 226 may also include a bore 230 with a pressure probe 232 positioned along the axis of the bore. A vacuum line 234 may then be connected to the bore 230 such that a vacuum may be drawn against a flexible inner container which is positioned against a relieved lower face 228. The flexible inner container 236 may include a flexible ring 237 which is formed about the mouth of the container with the ring functioning as previously described to permit movement of the flexible container in an upward direction away from the narrowed neck opening of a rigid outer container such that the outer container may then be charged with propellant through undercap filling.

As illustrated, the flexible inner container 236 need not include an inserting tip, such as the inserting tip 218 illustrated in FIG. 25. To assist in the insertion of the flexible container 236 into a rigid outer container, a bag positioner 238 may, thus, be positioned below the bag inserter 224. The bag positioner 238 may include a conical member 240 leading to a cylindrical member 242 having an opening 246. The bag positioner 238 may be supported by a support member 244 which has an opening that corresponds to the diameter of the cylindrical member 242. The opening in the support member 244 may, thus, engage the exterior surface of the cylindrical member 242.

A rigid outer container 248 may be positioned with a neck opening 250 for the container aligned with the opening 246, with pressure being supplied to pressure probe 232 such that the side surfaces of the inner container 236 may assume the configuration indicated as 236a through contact of the inner container with the conical member 240. Due to the guiding contact of the conical member 240 with flexible inner container 236, the inner container may be readily forced through the neck opening 250 into the interior of the outer container 248. After insertion of the inner container 236 within the outer container 248, the inner container may assume the general position indicated as 236b.

FIG. 28 is a partial section through the neck of a barrier-pack aerosol container which illustrates the use of a container cap that is particularly suitable for undercap filling of a barrier-pack container according to the present invention. A cap 252 is joined to a rigid outer container 254 with the cap being crimped to fit a narrowed neck 256 of the container. The cap 252 may include a sidewall 258 which may be deformed, as described with regard to FIG. 6, during the crimping of the cap with respect to the neck 256.

As described, a rigid outer container, such as rigid outer container 254 may be charged with propellant through the use of an undercap filling procedure. During charging of the outer container 254 with propellant, the cap 252 may be lifted away from the neck 256 of the container, along with a flexible inner container which is in contact with the exterior surface of the cap. Propellant, thus, may be charged beneath the raised cap 252 into the region between the rigid outer container 254 and the flexible inner container.

To assist in raising of the flexible inner container along with the cap 252, the cap may have a plurality of outwardly extending buttons 260 formed on the cap sidewall 258. When a flexible inner container 262 is positioned in contact with the exterior surface of sidewall 258 prior to crimping of the cap 252, a flexible ring 264 on the inner container may be positioned above the buttons 260 on the cap sidewall. The buttons 260 may, thus, assist in maintaining the flexible ring 264 in tight-fitting contact with the exterior surface of the cap sidewall 258 so that the ring may be pulled upwardly along with cap 252 during undercap pressurization of the outer container 254 with propellant.

After filling the rigid outer container 254 with propellant in the general manner described in regard to FIG. 6, the cap 252 may then be crimped to the neck 256 in the manner generally described in FIG. 7. During crimping of the cap 252, the upper portion of the cap may be rolled downwardly to form a crimped portion 266 which is in tight-fitting engagement with the neck 256. Additionally, the bottom 268 of cap 252 may be contacted during crimping, the cap having a center portion 270 which is recessed and retains a standard valve assembly and dispensing head.

The cap sidewall 258 may then be deformed outwardly to form a circumferentially flared portion which is positioned in close proximity to the inner surface of container 254. As described with regard to FIG. 11, during crimping of the cap 252, a space may be left between the sidewall 258 and the interior surface of container 254, which is sufficient to provide for the thickness of flexible inner container 262. In this manner, tearing of the flexible material forming the container 262 may be prevented during crimping of the cap 252 by avoiding sliding contact of the cap 252 and outer container 254 with the flexible material of the inner container.

The flexible ring 18, as shown in FIG. 3, may be conveniently formed simply by making an elongated container neck portion 26 and then melting the excess thermoplastic material of the neck portion within a die to form the flexible ring. The presence of the flexible means, such as ring 18, on the inner container, permits the elimination of the gasket which surrounds a conventional dispensing cap since the flexible means also acts as a gasket in forming the aerosol dispensing system.

What is claimed is:

1. A method for inserting a flexible inner container having a bottom surface within a rigid outer container having a neck opening in the formation of an aerosol dispensing system, said method comprising:
   aligning a bottom surface of the flexible inner container with said neck opening, and
   applying a pressure to the inside of said aligned bottom surface of said inner container to force said bottom surface through the neck opening with the balance of the inner container being pulled by the bottom surface into the rigid outer container.

2. The method of claim 1 wherein said flexible inner container has a mouth opening and including
   holding said mouth opening in an open position while aligning said bottom surface with said neck opening before applying a pressure to the inside of said aligned bottom surface of the inner container in forcing the inner container through said neck opening.

3. The method of claim 2 including
   applying a vacuum to the flexible inner container through said mouth opening in positioning the inner container in alignment with the neck opening, and
   applying a stream of gas to the interior of the flexible inner container in forcing the flexible inner container into the rigid outer container with said stream of gas being directed toward said neck opening.

4. The method of claim 1 including
   placing a guide surface at the neck opening with the guide surface defining a larger opening than said neck opening, and
   contacting the guide surface with the flexible inner container such that the flexible inner container follows along the guide surface in movement of the flexible inner container through the neck opening into the rigid outer container.

5. An apparatus for inserting a flexible inner container through a neck opening of a rigid outer container in forming an aerosol system in which the flexible inner container has a mouth opening and a bottom, said apparatus comprising:
   means for supporting the flexible inner container with the mouth opening of the inner container in an opened condition and with the bottom of said flexible inner container aligned with the neck opening of said rigid outer container, and
   means for directing a stream of gas into the mouth opening and against the inside bottom of the inner container to move the inner container in the direction of the stream of gas and away from the means for supporting the flexible inner container to force the flexible inner container through the neck opening of a rigid outer container by directing the said stream of gas toward the neck opening.

* * * * *